(12) United States Patent
Ouyang et al.

(10) Patent No.: US 9,955,488 B2
(45) Date of Patent: Apr. 24, 2018

(54) MODELING NETWORK PERFORMANCE AND SERVICE QUALITY IN WIRELESS NETWORKS

(71) Applicant: Verizon Patent and Licensing Inc., Arlington, VA (US)

(72) Inventors: Ye Ouyang, Piscataway, NJ (US); Carol Becht, Boonton, NJ (US); Krishna Pichumani Iyer, Aurora, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 82 days.

(21) Appl. No.: 15/087,129

(22) Filed: Mar. 31, 2016

(65) Prior Publication Data

US 2017/0290024 A1    Oct. 5, 2017

(51) Int. Cl.
*H04W 72/08* (2009.01)
*H04W 24/08* (2009.01)
*H04W 16/00* (2009.01)
*H04L 12/24* (2006.01)

(52) U.S. Cl.
CPC ....... *H04W 72/085* (2013.01); *H04L 41/0896* (2013.01); *H04L 41/16* (2013.01); *H04L 41/5009* (2013.01); *H04W 16/00* (2013.01); *H04W 24/08* (2013.01)

(58) Field of Classification Search
CPC ..... H04W 24/04; H04W 16/18; H04W 16/22; H04W 24/10; H04W 24/08; G06F 19/12; G01N 2015/1006; G01N 2015/1465; G01N 15/1463; G06T 7/0016; G06T 11/206; G06T 2200/24; G06T 2207/20072; G06T 2207/30024; G06T 2207/10056; G06K 9/00127
See application file for complete search history.

(56) References Cited

U.S. PATENT DOCUMENTS

| | | | | |
|---|---|---|---|---|
| 5,444,820 A | * | 8/1995 | Tzes | G06N 3/0436 706/10 |
| 8,291,069 B1 | * | 10/2012 | Phillips | G06F 17/18 375/341 |
| 2017/0034720 A1 | * | 2/2017 | Gopalakrishnan | H04W 16/18 |

* cited by examiner

*Primary Examiner* — Yee Lam

(57) ABSTRACT

A recursive algorithm may be applied to group cells in a service network into a small number of clusters. For each of the clusters, different regression algorithms may be evaluated, and a regression algorithm generating a smallest error is selected. A total error for the clusters may be identified based on the errors from the selected regression algorithms and from degrees of separation associated with the cluster. If the total error is greater than a threshold value, the cells may be grouped into a larger number of clusters and the new clusters may be re-evaluated. A key performance indicator (KPI) may be estimated for a cell based on a regression algorithm selected for the cluster associated with the cell. A resources may be allocated to the cell based on the KPI value.

20 Claims, 7 Drawing Sheets

MODELING NETWORK PERFORMANCE AND SERVICE QUALITY IN WIRELESS NETWORKS

BACKGROUND

Users may employ mobile devices, such as smart phones, to access cellular networks to perform various tasks. For example, users may access cellular networks to make telephone calls, exchange short messaging service (SMS) and e-mail messages, access streaming multimedia content or other data through the World Wide Web, obtain data for applications or services (such as mapping data), monitor and control various connected "smart" devices, etc. Cellular technology is continuously evolving from first generation (1G), second generation (2G) and third generation (3G) cellular technologies, such as the universal mobile telecommunications system (UMTS), to fourth generation (4G) technologies, such as long-term evolution (LTE), and beyond, such as to fifth generation (5G) or other next generation networks, to enable improved network access. Nevertheless, even as technology advances, cellular networks will continue to have limited resources that are allocated among different regions (or cells). However, it may be difficult for service providers to predict usage levels in the different cells, to predict impacts of the predicted usage levels on services within the cells, and effectively allocate network resources to provide optimal network performance in view of the predicted impacts of the usage levels.

DETAILED DESCRIPTION OF THE PREFERRED EMBODIMENTS

Figure 1:
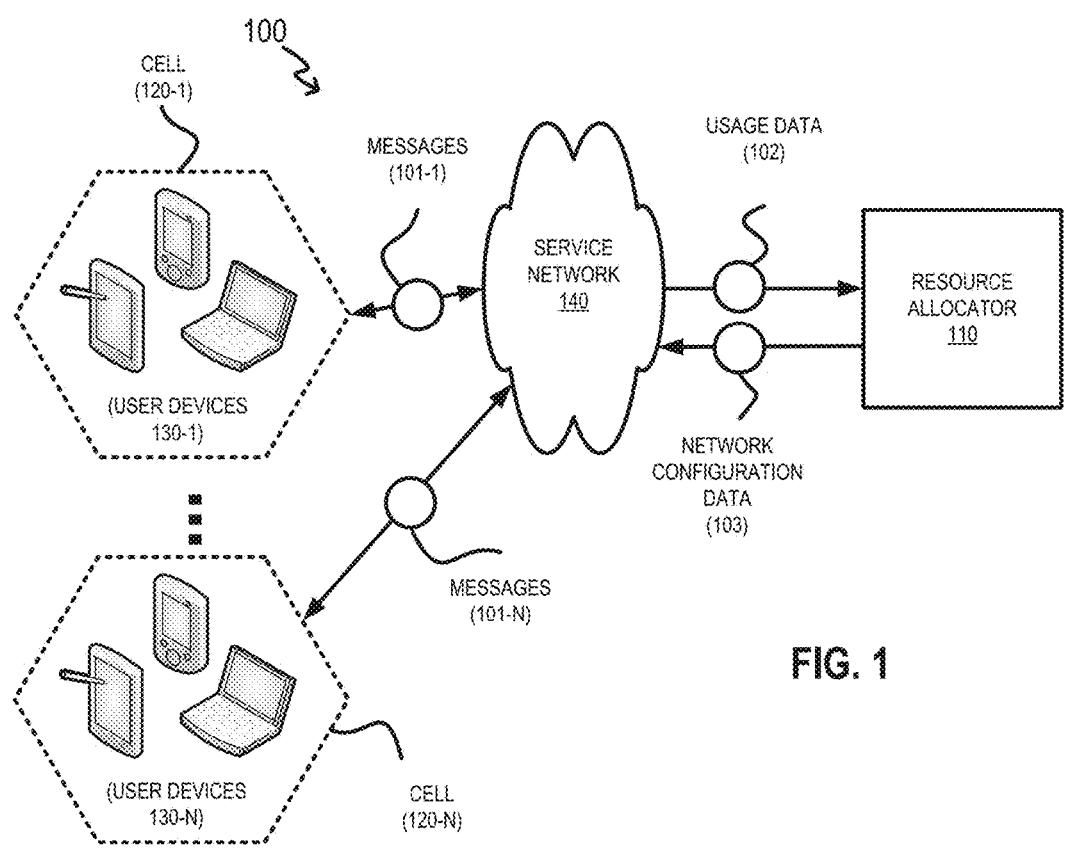
FIG. 1 is a block diagram of an exemplary environment for allocating communications resources.

The following detailed description refers to the accompanying drawings. The same reference numbers in different drawings may identify the same or similar elements. The following detailed description does not limit the invention.

Mobile communication technology is continuously evolving, and service providers evaluate network accessibility performance by predicting specific network performance metrics (referred to, herein, as key performance indicators or "KPIs"). The described prediction methodology is versatile to adapt to changed or new consumer behaviors (e.g., the use of new applications and/or services by consumers) and/or changes in network capabilities. For example, technological advances may enable some network cells to operate at a higher capacity and/or to better support certain services and/or communications.

Certain implementations disclosed herein relate to predicting KPIs as a function of consumed network resources for a wireless network. In certain implementations, predicting the KPIs may include developing novel regression algorithms for to correlate a given KPI to the corresponding network resources for cells in the network. While various traditional approaches to network resource allocation consider each cell individually, certain implementations described herein may use big data analytics to process measurable data of wireless networks to reveal information about mobile network resource usage behind the data. Big data algorithms use large amounts of trustworthy data to analyze current resource usage within the network and enable the use of recursive algorithms to achieve improved accuracy to model the network performance.

For example, big data analytics algorithms may include clustering communications cells within a service network into clusters. Large data analytics may then be used for (1) correlating service performance indicators/or service quality indicators with relevant network resource indicators within the clusters; (2) identifying trends for the network performance indicators/or service quality indicators based upon observed correlations of the indicators to network resources; and (3) allocating network resources within the clusters based on the trends to maintain desired service performance quality levels or quality of experience levels.

When estimating KPIs for a given cell, the amount of available data may be increased by aggregating (or clustering) the given cell with other cells and using data from the aggregated cells to estimate the KPIs. However, different cells may be associated with different behavior patterns, and inaccurate predictions may be generated if data from cells of different behavior patterns are used. For example, data related to cells located in dense, urban areas may not be useful for modeling KPIs for a cell located in a sparsely populated rural area. Also, even if different cells have certain similarities (e.g., cells in urban areas), customers in those cells may have different behavior patterns that could produce inaccurate modeling results if those cells were grouped together. For example, customers in a given cell may use more certain data-based applications (e.g., accessing e-mails, browsing the web, streaming music or movie, using broadband telephony or videos calls, etc.) than customer in other cells. Consequently, using measured data from arbitrarily grouped cells may result in decreased prediction accuracy and dilute the homogeneity of service performance for the cells in the same cluster.

In certain implementations, statistical techniques may be used to cluster cells having similarities. For example, a recursive method may be used to identify a quantity (K) of clusters from a group of cells. While this number of clusters, which is the best K, may often be difficult to determine directly, in certain implementations the system and method may automatically select a quantity of k clusters to use, to achieve a desired accuracy level.

Traditional approaches to plan network capacity typically assume homogeneity among cells and, therefore, use a common regression algorithm to produce predictions for the perspective needed network resources. However, this approach may lead to prediction errors if the regression algorithm is not adapted to fit data for all of the cells. In certain implementations, the system and method may parsimoniously select regressions algorithms for different clusters of cells. For example, the system may select a different, more accurate regression algorithm for each of the cell clusters.

In certain implementations, data regarding historically consumed network resources within the k clusters (identified as previously described) may be collected during a given time period (e.g., usage data may be captured at thirty minute intervals over a four month period), and a KPI measured value may be defined for each measurement. For example, a consumed network resource may refer to a feature directly accessible by the service network, such as transmitted power, channel element, code utilization, user plane channel, Resource Bearer etc. The KPI may then be estimated for different clusters using the respective regressions algorithms selected for the clusters.

FIG. 1 is a block diagram of an exemplary environment 100 for allocating communications resources. As shown in FIG. 1, environment 100 may include, for example, a resource allocator 110, cells 120 (shown in FIG. 1 as cells 120-1 through 120-N) that connect users devices 130 (shown in FIG. 1 as users devices 130-1 through 130-N that are connected to, respectively, cells 120-1 through 120-N) to a service network 140. For example, cells 120 may exchange messages 101 (shown in FIG. 1 as messages 101-1 through 101-N that are connected to, respectively, cells 120-1 through 120-N) with service network 140 to enable various communications and services to user devices 130.

Resource allocator 110 may interface with service network 140 to obtain usage data 102 associated with cells 120. For example, usage data 102 may identify a quantity of messages 101 associated with cells 120 during a given time period and/or an amount of data exchanged within messages 101, etc. Usage data 102 may further identify the types of messages 101 (e.g., telephone calls, multimedia content, application data, program code, etc.) exchanged in messages 101 for cells 120. Usage data 102 may also identify performance attributes of messages 101, such as transmission times, transmission delays, packet drops rates, jitter rates, etc. In another example, if the transmission relate to voice calls, the KPIs may relate to tonal quality.

As described below, resource allocator 110 may use a portion of usage data 102 to group cells 120 into one or more clusters. Resource allocator 110 may further use the same or another portion of usage data 102 to predict future usage data 102 and to predict one or more KPIs associated with the predicted future usage data 102. To improve the accuracy of the predictions and to simplify the analysis of the large amount of information included in usage data 102, resource allocator 110 may employ a recursive algorithm to cluster certain cells 120. Resource allocator 110 may then apply various statistical techniques to analyze the clustered cells 120 to predict future messages 101 and to predict transmission characteristics, KPIs, etc. associated with future messages 101. Resource allocator 110 may then generate network configuration data 103 to allocate network resources within service network 140 to achieve desired predicted transmission characteristics.

Cells 120 may correspond to coverage areas associated with a base station, such as a Long Term Evolution (LTE) eNodeB, or enhanced node B. User devices 130, such as mobile communication devices, located within the coverage areas associated with cells 120, may communicate with the base stations via wireless signals to access communications, data, and/or services provided by service network 140. Cells 120 may combine to form a cellular network, and user devices 130, when moving through the cellular network, may be handed over from one cell 120 to another cell 120 to maintain access to service network 140. Cells 120 may be associated with different sized and/or shaped coverage areas, and each cell 120 may be configured, by resource allocator 110, to handle different quantities and/or types of messages 101.

Cells 120 may employ various technologies for enabling wireless data exchange including, for example, LTE, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), WiFi, etc.

User device 130 may be a mobile device having communication capabilities and, thus, may communicate with a base station within cell 120 using a variety of different wireless channels. In some embodiments, the mobile device may communicate with environment 100 using a wired connection. Thus, user device 130 may be a mobile device that may include, for example, a cellular telephone, a smart phone, a tablet, a set-top box (STB), a mobile phone, any type of IP communications device, a Voice over Internet Protocol (VoIP) device, a laptop computer, a palmtop computer, a gaming device, a media player device, or a consumer device that includes communication capabilities (e.g., wireless communication mechanisms).

Service network 140 be any type of wide area network or series of networks connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. In some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

Figure 2:
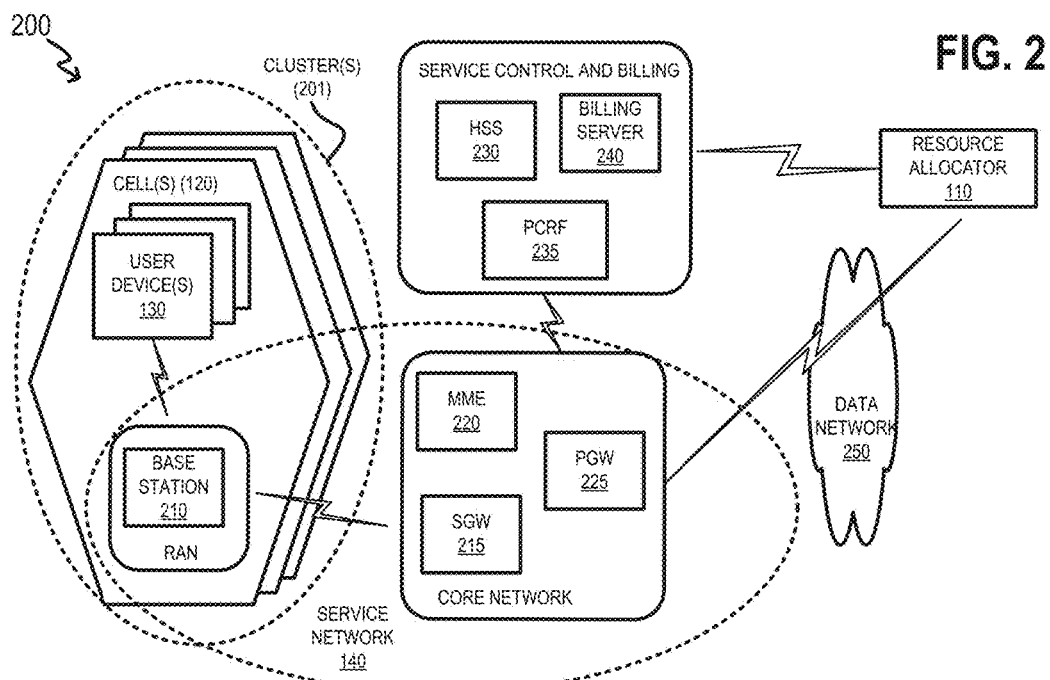
FIG. 2 is a block diagram of an exemplary wireless environment for allocating communications resources.

FIG. 2 illustrates an exemplary wireless environment 200 in which systems and/or methods, described herein, may be implemented. Wireless environment 200 may correspond to a service network 140 associated with a LTE or other advanced wireless communications and data network. As shown in FIG. 2, wireless environment 200 may include resource allocator 110, cells 120 (associated with user devices 130) that are grouped into cluster(s) 201 by resource allocator 110, a base station 210, a serving gateway (SGW) 215, a mobility management entity device (MME) 220, a packet data network (PDN) gateway (PGW) 225, a home subscriber server (HSS) 230, a policy and charging rules function (PCRF) 235, a billing server 240, and a data network 250. In wireless environment 200, resource allocator 110, cells 120, and user devices 130 may operate as described above with respect to FIG. 1

Wireless environment 200 may include a radio access network (RAN) that is associated with a LTE network and/or another type of wireless communications network, and a core network, such as an evolved packet core (EPC) that operates based on a third generation partnership project (3GPP) wireless communication standard. The RAN may include one or more base stations 210, such as evolved Node Bs (eNBs), via which user device 130 communicates with the core network. As shown in FIG. 2, the core network may include SGW 215, MME 220, and PGW 225 and may control access by user device 130 to data network 250, communications services, and/or to cloud services. In wireless environment 200, a service control and billing portion may include HSS 230, PCRF 235, and/or billing server 240. The service control and billing portion may process calls on behalf of user device 130. The service control and billing portion may further manage authentication, connection initiation, account information, user profile information, etc. associated with access by user device 130.

Base station 210 may include one or more network devices that receive, process, and/or transmit traffic, such as audio, video, text, and/or other data, destined for and/or received from user device 130. In an example implementation, base station 210 may be an eNB device and may be part of the LTE network. Base station 210 may receive traffic from and/or send traffic to data network 250 via SGW 215 and PGW 225. Base station 210 may send traffic to and/or receive traffic from user device 130 via a wireless interface. Base station 210 may be associated with a RAN.

SGW 215 may include one or more network devices, such as a gateway, a router, a modem, a switch, a firewall, a network interface card (NIC), a hub, a bridge, a proxy server, an optical add-drop multiplexer (OADM), or another type of device that processes and/or transfers network traffic. SGW 215 may, for example, aggregate traffic received from one or more base stations 210 and may send the aggregated traffic to data network 250 via PGW 225. In one example implementation, SGW 215 may route and forward user data packets, may act as a mobility anchor for a user plane during inter-eNB handovers, and may act as an anchor for mobility between LTE and other 3GPP technologies.

MME 220 may include one or more network devices that perform operations associated with a handoff to and/or from service network 140. MME 220 may perform operations to register user device 130 with service network 140, to handoff user device 130 from service network 140 to another network, to handoff a user device 130 from the other network to the service network 140, and/or to perform other operations. MME 220 may perform policing operations for traffic destined for and/or received from user device 130. MME 220 may authenticate user device 130 (e.g., via interaction with HSS 230) to establish session between user device 130 and another device via service network 140.

PGW 225 may include one or more network devices, such as a gateway, a router, a modem, a switch, a firewall, a NIC, a hub, a bridge, a proxy server, an optical add/drop multiplexor (OADM), or another type of device that processes and/or transfers network traffic. PGW 225 may, for example, provide connectivity of user device 130 to data network 250 by serving as a traffic exit/entry point for user device 130. PGW 225 may perform policy enforcement, packet filtering, charging support, lawful intercept, and/or packet screening. PGW 225 may also act as an anchor for mobility between 3GPP and non-3GPP technologies.

HSS 230 may manage, update, and/or store profile information associated with a generated identifier that identifies services and/or data that may be accessed by user device 130. Additionally or alternatively, HSS 230 may perform authentication, authorization, and/or accounting operations associated with a communication connection with user device 130. In some implementations, HSS 230 may maintain billing information and may assess charges and credits to an account associated with user device 130 based on network usage information received from the core network and/or from the cloud services. Additionally or alternatively, HSS 230 may store information regarding temporary credentials that are assigned to user device 130 (e.g., as used to access cloud-based services).

PCRF 235 may include one or more devices that provide policy control decisions and flow based charging control functionalities. PCRF 235 may provide network control regarding service data flow detection, gating, quality of service (QoS) and flow based charging, etc. PCRF 235 may determine how a certain service data flow shall be treated, and may ensure that user plane traffic mapping and treatment are in accordance with a user's subscription profile. For example, PCRF 235 may identify and apply a user profile related to user device 130 when transmitting first verification data 103.

Billing server 240 may store data identifying changes in services (e.g., based on receiving registration data 101 from verification device 150) and may modify user and device profiles, as applied by HSS 230 and/or PRCF based on the service changes. Billing server 240 may further determine and collect fees associated the requested service changes.

Data network 250 may include one or more wired and/or wireless networks. For example, data network 250 may include the Internet, a public land mobile network (PLMN), and/or another network. Additionally, or alternatively, data network 250 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

The number of devices and/or networks, illustrated in FIG. 2, is provided for explanatory purposes only. In practice, wireless environment 200 may include additional devices and/or networks, fewer devices and/or networks, different devices and/or networks, or differently arranged devices and/or networks than those illustrated in FIG. 2. In some implementations, one or more of the devices of wireless environment 200 may perform one or more functions described as being performed by another one or more of the devices of wireless environment 200. Devices of wireless environment 200 may interconnect via wired connections, wireless connections, or a combination of wired and wireless connections.

Figure 3:
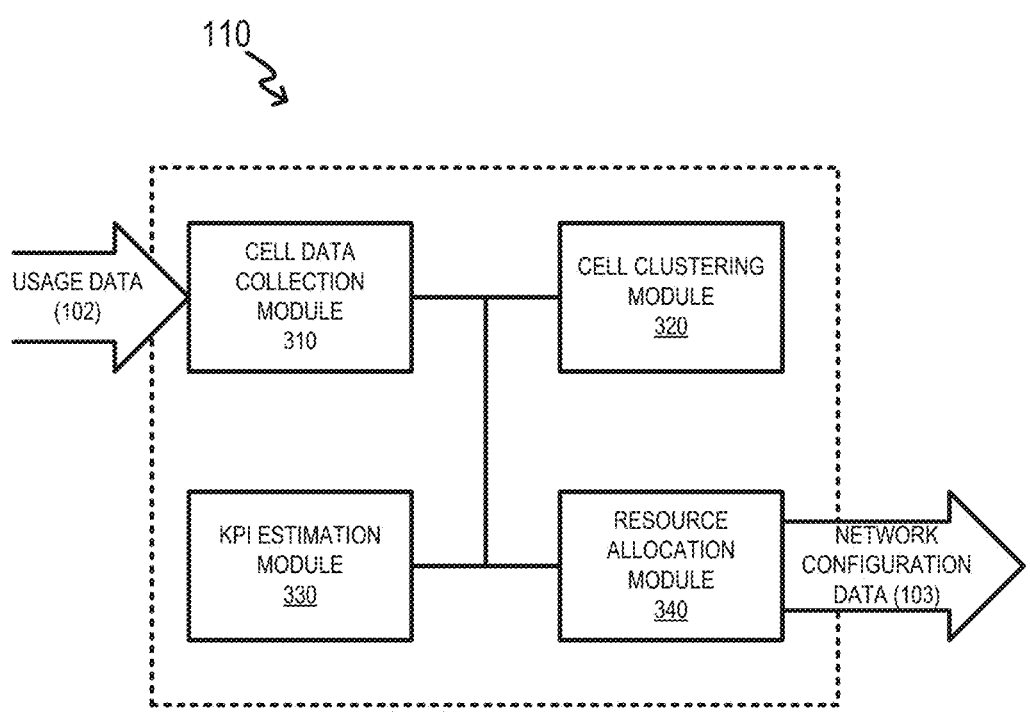
FIG. 3 is a block diagram showing exemplary components of a resource allocator that may be included in the environments of FIG. 1 or 2.

FIG. 3 is a block diagram illustrating exemplary components of resource allocator 110 according to one implementation. As shown in FIG. 3, resource allocator 110 may include, for example, a cell data collection module 310, a cell clustering module 320, a KPI estimation module 330, and a resource allocation module 340.

Cell data collection module 310 may collect information regarding messages 101 between user devices 130 and service network 140. Cell data collection module 310 may collect measureable network performance parameters (which are also referred to as "network key performance indicators" (NKPIs) and device key performance indicators (DKPIs)). The NKPIs may include radio frequency KPI (RFKPIs) and network time delay key performance indicators (NTDKPIs). The DKPIs may include, for example, user equipment (UE) logs containing processor timing, user interface delays, etc. Cell data collection module 310 may collect data from network elements within service network 140 and/or from sensors positioned throughout service network 140. In another example, data collection module 310 may derive data from traffic measurements within service network 140.

In one implementation, cell data collection module 310 may also collect information regarding attributes associated with cells 120. Cell data collection module 310 may interface with a network element in service network 140 to identify attributes associated with cells 120. For example, cell data collection module 310 may exchange data with backend systems associated with service network 140 to obtain the attributes. The attributes may include, but are not limited to, information associated with equipment within each of cells 120, such as geographic locations of transmitting equipment, the type of the equipment used within a cell 120, and/or other attributes of the equipment, such as communications ranges of the transmitters, the bandwidth capacity of the equipment, buffering sizes, processing capabilities, a number of ports, a number of data channels, equipment being serviced (e.g., equipment that is not in service), a number of communications channels and/or ports) available to a cell 120 during a given time period, etc. Additionally or alternatively, cell data collection module 310 may collect data regarding attributes related to user devices 130 within each of cells 120, such as identifying types of user devices 130 within cell 120, a quantity of user devices 130 within cell 120, attributes of customers associated with user devices 130, etc.

Cell clustering module 320 may use at least a portion of usage data 102 gathered by cell data collection module 310 to group cells 120 into one or more clusters 201. As described below with respect to FIG. 6, cell clustering module 320 may apply a recursive technique to form a quantity (k) of cluster(s) 201 of cells 120 that are expected to produce a prediction error that is less than a desired threshold error level. For example, cells 120 may be initially grouped into a single cluster 201, and a "best" (e.g., most accurate) regression algorithm may be derived for the single cluster 201. Cell clustering module 320 may estimate an error from using the single cluster 201, and if the error from using a single cluster is less than a threshold error value, cell clustering module 320 may identify the single cluster 201 to be used by KPI estimation module 330. If the error from using a single cluster 201 is greater than a threshold error value, cell clustering module 320 may increase the number of clusters 201 to two or more, and cell clustering module 320 may select a best regression algorithm for each of clusters 201. Cell clustering module 320 may continue to increase the number of clusters 201 until a resulting expected error is less a threshold error value.

In certain implementations, cell clustering module 320 may, when calculating the expected error from using a quantity (k) of clusters 201, may evaluate an expected prediction error for each of the clusters using a best regression algorithm. In addition, to check that clusters 201 are performing well, cell clustering module 320 may compute, as a global indicator for clusters 201, a cluster separation that measures how "distant" clusters 201 are from each other. For example, cell clustering module 320 may check to see if two clusters 201 produce such similar predictions (e.g., have less than a threshold separation) that combining these two clusters 201 may improve predictive accuracy or produce similar levels of predictive accuracy with less computational overhead.

As described below with respect to FIG. 7, KPI estimation module 330 may use clusters 201 identified by cell clustering module 320 to predict future usage levels (e.g., a quantity of messages 101) for each of cells 120 and may estimate KPI values for cells 120 based on the predicted usage levels. In particular, instead of evaluating estimated KPIs on a cell by cell bases, KPI estimation module 330 may collectively evaluate groups of cells 120 included in clusters 201. By collectively evaluating multiples cells 120 in a given cluster 201, KPI estimation module 330 may generate accurate prediction results for the cluster 201 with fewer calculations. Furthermore, evaluating an individual cell 120 may lead to inaccuracy if insufficient prior usage and KPI data are available for that cell 120, and KPI estimation module 330 may achieve improved accuracy by combining data for multiple cells 120 in a given cluster 201.

Resource allocation module 340 may use the predicted KPI values generated by KPI estimation module 330. For example, if predicted usage and/or KPI values for a given cell 120 (or a given cluster 201) exceed a high threshold value, resource allocation module 340 may allocate additional network resources to that given cell 120 (or given cluster 201) during a future time period. Conversely, if predicted usage and/or KPI values for a given cell 120 (or a given cluster 201) are below a low threshold value, resource allocation module 340 may allocate fewer resources to that given cell 120 (or given cluster 201) during a future time period.

Figure 4:
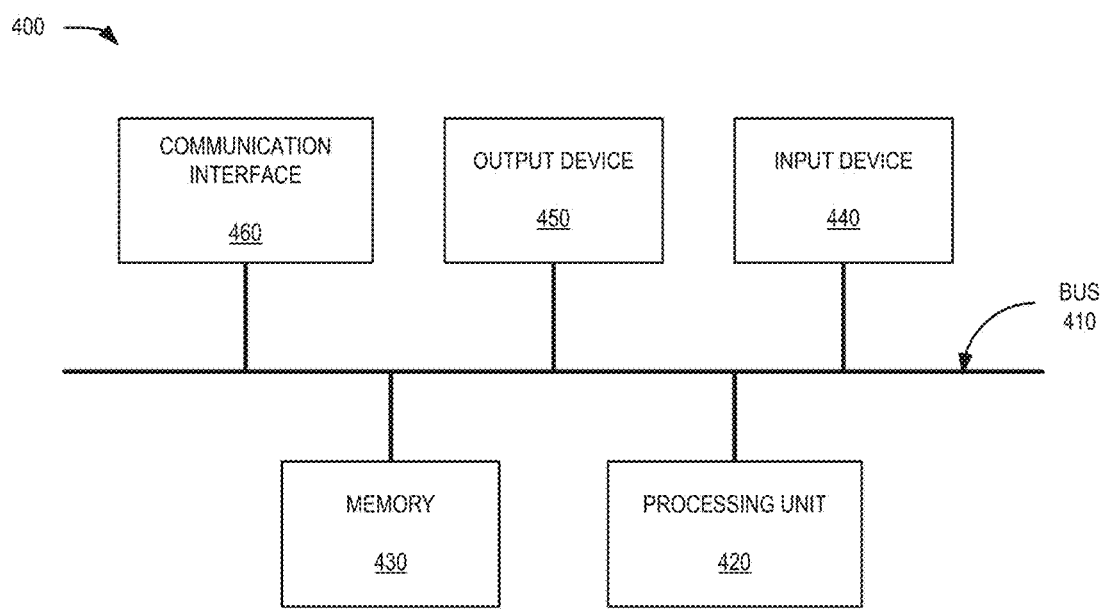
FIG. 4 is a block diagram showing exemplary components of a computing device included in the environments of FIG. 1 or 2.

FIG. 4 is a block diagram showing exemplary components of a computing device 400 according to one implementation. As shown in FIG. 4, computing device 400 may include a bus 410, a processing unit 420, a memory 430, an input device 440, an output device 450, and a communication interface 460. Resource allocator 110, user device 130, components of wireless environment 200 shown in FIG. 2, and/or components of allocation device 110 shown in FIG. 3 may each include one or more computing devices 400.

Bus 410 includes a path that permits communication among the components of computing device 400. Processing unit 420 may include any type of single-core processor, multi-core processor, microprocessor, latch-based processor, and/or processing logic (or families of processors, microprocessors, and/or processing logics) that interprets and executes instructions. In other embodiments, processing unit 420 may include an application-specific integrated circuit (ASIC), a field-programmable gate array (FPGA), and/or another type of integrated circuit or processing logic. For example, processing unit 420 may be an x86 based CPU, and may use any operating system, which may include varieties of the Windows, UNIX, and/or Linux operating systems. Processing unit 420 may also use high-level analysis software packages and/or custom software written in any programming and/or scripting languages for interacting with other network entities.

Memory 430 may include any type of dynamic storage device that may store information and/or instructions, for execution by processing unit 420, and/or any type of non-volatile storage device that may store information for use by processing unit 420. For example, memory 430 may include a random access memory (RAM) or another type of dynamic storage device, a read only memory (ROM) device or another type of static storage device, and/or a removable form of memory, such as a flash memory. In another example, memory 430 may include any type of on-board device suitable for storing large amounts of data, and may include one or more hard drives, solid state drives, and/or various types of redundant array of independent disks (RAID) arrays.

Input device 440 may enable an operator to input information into computing device 400, if desired. Input device 440 may include, for example, a keyboard, a mouse, a pen, a microphone, a remote control, an audio capture device, an image and/or video capture device, a touch-screen display, and/or another type of input device. In some embodiments, computing device 400 may be managed remotely and may not include input device 440. Output device 450 may output information to an operator of computing device 400. Output device 450 may include a display (such as a liquid crystal display (LCD)), a printer, a speaker, and/or another type of output device. In some embodiments, computing device 400 may be managed remotely and may not include output device 450.

Communication interface 460 may include a transceiver that enables computing device 400 to communicate within environment 100 with other devices and/or systems. The communications interface 460 may be configured to exchange data with other devices over wired communications (e.g., conductive wire, twisted pair cable, coaxial cable, transmission line, fiber optic cable, and/or waveguide, etc.), or a combination of wireless. In other embodiments, communication interface 460 may interface with a network (e.g., service network 140) using a wireless communications channel, such as, for example, radio frequency (RF), infrared, and/or visual optics, etc. Communication interface 460 may include a transmitter that converts baseband signals to RF signals and/or a receiver that converts RF signals to baseband signals. Communication interface 460 may be coupled to one or more antennas for transmitting and receiving RF signals. Communication interface 460 may include a logical component that includes input and/or output ports, input and/or output systems, and/or other input and output components that facilitate the transmission/reception of data to/from other devices. For example, communication interface 460 may include a network interface card (e.g., Ethernet card) for wired communications and/or a wireless network interface (e.g., a WiFi card) for wireless communications. Communication interface 460 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

Computing device 400 may perform various operations, and computing device 400 may perform these operations in response to processing unit 420 executing software instructions contained in a computer-readable medium, such as memory 430. The software instructions may be read into memory 430 from another computer-readable medium or from another device. The software instructions contained in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of computing device 400, in other implementations, computing device 400 may include fewer components, different components, additional components, or differently arranged components than depicted in FIG. 4. Additionally, or alternatively, one or more components of computing device 400 may perform functions described as being performed by one or more other components of computing device 400.

Figure 5:
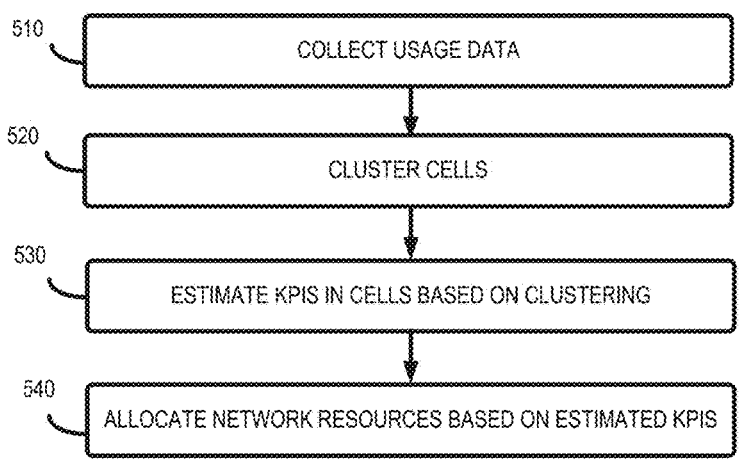
FIG. 5 is a flow chart showing an exemplary process for allocating communications resources within cells of a service network.

FIG. 5 is a flow diagram showing an exemplary process 500 for allocating network resources within service network 140, such as an LTE network. In one embodiment, process 500 may be performed by components of resource allocator 110 depicted in FIG. 3. In other embodiments, one or more portions of process 500 may performed by one or more other components of environment 100 and/or wireless environment 200, such as user device 130 and/or a component of service network 140.

As shown in FIG. 5, process 500 may include collecting usage data regarding service network 140 (block 510). For example, cell data collection module 310 may communicate with components of service network 140 (e.g., one or more backend components of wireless environment 200). For example, resource allocator 110 may select KPIs that may be relevant for network resources, and may further identify types of usage data 102 that may be relevant to the selected KPIs. For example, to forecast a network resource related to telephone calls, resource allocator 110 may evaluate various KPIs, such as pitch accuracy, volume, connection delays, drop calls, jitter, etc.

Figure 6:
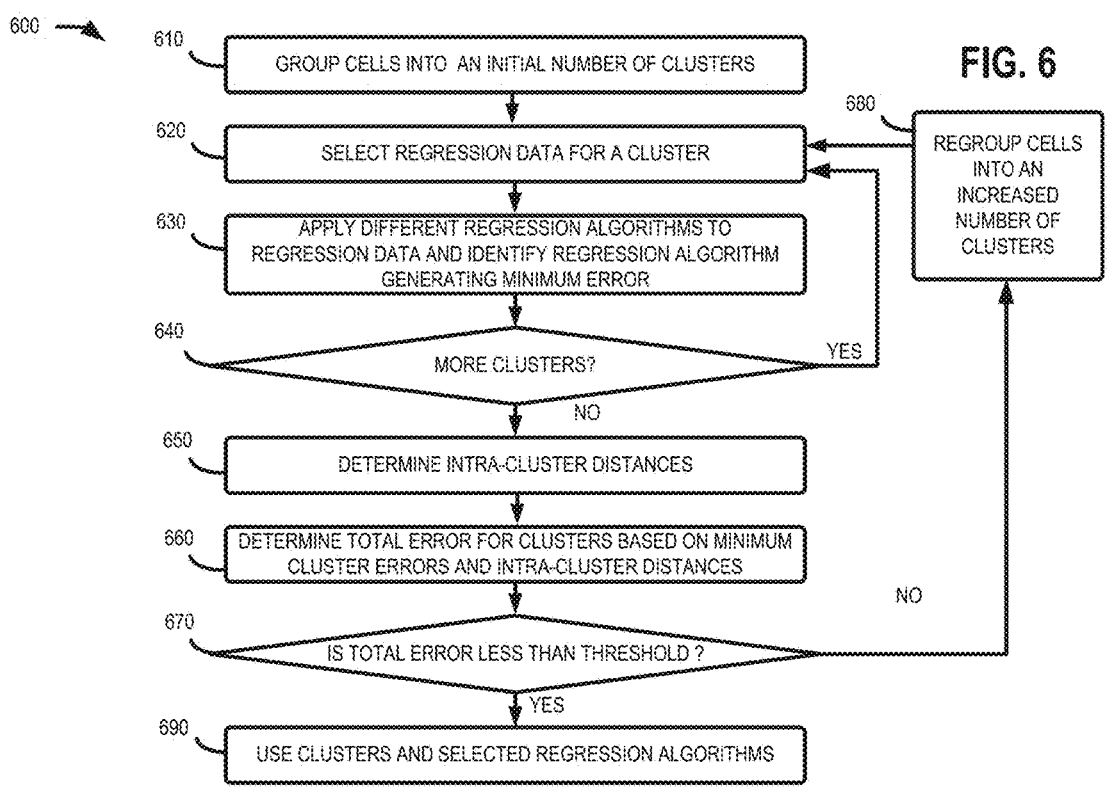
FIG. 6 is a flow chart showing an exemplary process for clustering cells in a service network.

As shown in FIG. 5, process 500 may further include clustering cells 120 (block 520). The clustering of cells 120 is described with respect to FIG. 6. FIG. 6 is a flow diagram showing an exemplary process 600 for clustering cells 120 within service network 140, such as an LTE network. In an embodiment, process 600 may be performed by components of resource allocator 110 depicted in FIG. 3. In other embodiments, one or more portions of process 600 may performed by one or more other components of environment 100 and/or wireless environment 200, such as user device 130 and/or a component of service network 140.

As shown in FIG. 6, process 600 may include grouping cells 120 into an initial number of clusters 201 (block 610). For example, cell clustering module 320 may start by allocating cells 120 into a single cluster (e.g., the number of clusters k equals 1). If the number of clusters 201 is greater than one (e.g., after the number K of clusters 201 is increased in block 680), cell clustering module 320 may use various clustering algorithms to distribute cells 120 into the clusters. For example, cell clustering module 320 may cluster cells 120 having similar KPI and/or usage data 102 during a given timer period into the k clusters 201. Additionally or alternatively, cell clustering module 320 may cluster cells 120 into the k clusters 201 based on the similarities in cells 120 (e.g., geographic proximity, similar number of customers, similar transmission components, etc.)

In block 620, cell clustering module 320 may select training data for one of the k clusters. Because usage data 102 may relate to many different types of consumed network features, cell clustering module 320 may select a portion of usage data 102 that is relevant to the KPIs for the allocated resource. Feature selection is a machine learning technique that includes selecting a subset of relevant features from the original set of features, and cell clustering module 320 performs this selection to prevent over-fitting issues when applying models by removing non-informative features. Cell clustering module 320 may filter usage data 102 to remove irrelevant and/or redundant features. For example, for any type of KPI, cell clustering module 320 may remove features which have more than a threshold number (e.g., 98%) of non available values, more than a threshold number (e.g., 98%) of zero values, or which takes only the same value.

Additionally, cell clustering module 320 may identify a relevant KPI (e.g., a KPI used by resource allocation module 340 to allocate network resources) and may filter usage data 102 in view of the identified KPI. For example, cell clustering module 320 may identify a subset of features (e.g., six features) related to the KPI using a selection technique called exhaustive search with linear regression for example, although other selection and regression techniques may also be used. Cell clustering module 320 may removes features that are redundant (e.g., by checking if the features would produce similar predictive results) or that would not be useful for predicting the selected KPI.

In block 620, cell clustering module 320 may spilt the filtered usage data 102 into a testing data set and a training data set. For example, in an approach known as K-fold cross-validation, a portion (e.g., 1/K) of the collected data set may be used to test the model in the training phase in order to limit problem of over-fitting, thereby giving an insight on how the model will generalize to an independent data set. For example, in a three-fold cross-validation, a portion (70%) of the collected data may be allocated to training and a relatively smaller portion (e.g., 30%) may be used for testing. A larger percentage may be used for training because training tends to be relatively data-intensive and data-amount-sensitive. In other examples, different proportions of the collected data may be allocated for training and testing, such as 10% (or a one-fold cross-validation) or 20% (or two-fold cross-validation) for testing and the remaining data being used for validation.

The test data set is independent of the training data set, but the test data set may contain the same independent and target KPI variables. The test data set may follow a similar probability distribution to the training set, and the test set may be used to assess the strength and utility of the predictive relationship derived by the training set. If a model fit to the training set also fits the test set accurately, minimal over-fitting may have taken place, and the model may be assumed to be accurate. If the model fits the training set better than the model fits the test set, over-fitting may have taken place.

As shown in FIG. 6, process 600 may include applying different regression algorithms to the regression data and identifying one of the regression algorithms generating a minimum error (block 630). The regression data selected in block 620 may be used by cell clustering module 320 to discover potentially predictive relationships between independent variables and the target KPI. Cell clustering module 320 may use the independent variables and the KPI in the regression set to train the relationships between the response values. For example, cell clustering module 320 may implement a training process to fit a model that can be used to predict the target network resource from the independent variables selected in the second step.

In block 630, cell clustering module 320 may use different regression algorithms to attempt to fit the KPI feature using the selected regression data (e.g., the training portion). The regression algorithms used by cell clustering module 320 in block 630 may be chosen to cover a wide range behavior patterns. For example, the regression algorithms may include non-linear regression algorithms that adapt to the KPI. Regression algorithms used in block 630 may give a prediction function, which is a function of prediction of the KPI from the consumed network features. Examples of regression algorithms used in the cell clustering module may include, but are not limited to a generalized additive model (GAM), a gradient boost method (GBM), a neural network method, and a multivariate adaptive regression splines (MARS) method.

In GAM, relationships between KPI response variable y and the consumed network resource input variables $x_1, \ldots, x_d$ are linked with Equation 1, where $E(\bullet)$ stands for expectancy. In this model, it is assumed that response variable y comes from an exponential family distribution. On the left, g stands for the generalized linear link function. On the right $f_1, \ldots, f_d$ stand for non-linear links between input variables, and $\beta_0$ is a constant term. Functions $f_j$ can be estimated with a non-parametric backfitting algorithm. This algorithm is iterative and at each step, functions $f_j$ are approximated using cubic third splines. In the context, y is the KPI and is assumed to follow a Gaussian distribution (which belongs to the exponential family), g=id, and $x_1, \ldots, x_d$ are data from the selected network features.

$$g(E(y))=\beta_0+f_1(x_1)+ \ldots +f_d(x_d) \quad \text{(Equation 1)}$$

In GBM, a decision tree ensemble method is used to perform regression. GBM is a sequential regression method, in the sense that each step leads to a component (called a basis function) added to the previous components. For each step, the basis function may be built using a tree, by fitting residuals of the previous steps. Therefore, each tree may be built by compensating weakness of previous trees, by reducing the loss function. For explicit computation, each basis function may be constructed to be maximally correlated with the negative gradient of the loss function.

Neural network is a machine learning model which approximates the output by letting inputs in a system of interconnected "neurons." Each neuron stands in a layer and its value may be deduced from neurons in previous layers, using a defined non-linear behavior summarized with weights. The weights may be modified when an input goes through the whole system, leading to improve the whole learning algorithm. The weights may be updated using a back-propagation algorithm, from the last layers to the first ones, and this algorithm may update weights by minimizing the gradient of defined loss function.

In MARS, the regression is fitted with a linear combination of hinge functions or product of hinge functions. A hinge function, defined in Equation 2, is non-linear, leading to a global non-linear model. Globally, the whole space may be divided into subspaces with a polynomial response for each of them. To separate the space and perform the regression, cell clustering module 320 may perform a forward pass to compute, in a iterative way, new basis functions with hinge functions by reducing the sum-of-squares residual error. Then, cell clustering module 320 may perform a backward pass to prune the model by removing the least effective terms to reduce over-fitting issues.

$$x \to \max(0,x-C) \text{ or } x \to \max(0,C-x); C \epsilon R \quad \text{(Equation 2)}$$

After using the test data to evaluate multiple regression algorithms, cell clustering module 320 may identify a "best" regression algorithm the produces a lowest error for the cluster. Cell clustering module 320 may use a test data set to calculate error rates (ERs) for the different regression algorithms. For example, ER for a regression algorithm may be calculated using Equation 3, in which ($y_1$) represents KPI data from the test set and ($\hat{y}_1$) represents results regenerated using a regression algorithm on the test set.

$$ER((y_1),(\hat{y}_1)):=\Sigma_1|y_1-\hat{y}_1| \quad \text{Equation 3}$$

Cell clustering module 320 may identify ERs for a cluster 201 with respect to each of the regression algorithms. Cell clustering module 320 may identify one of the regression algorithms generating a smallest ER value for a cluster.

As shown in FIG. 6, process 600 may include determining whether there are more clusters 201 (block 640). If there are more clusters 201 (block 640—Yes), blocks 620 and 630 are repeated for the other clusters 201 to identify a best regression algorithm for each of the k clusters, and associated ER values for the clusters 201 when using the best regression algorithm. As used herein, a lowest ER for cluster i (e.g., from using a best regression algorithm for cluster 201) is written ER(i).

As shown in FIG. 6, once a regression algorithm is selected for each of the clusters and there are no more clusters to evaluation (block 640-No), process 600 may further include determining intra-cluster differences between the clusters 201 (block 650). The cluster separation measures how distant clusters are from each other, checking if each cluster leads to specific predictions related to specific customer behaviors. The cluster separation quantity checks if considering different clusters gives better results instead of taking only one cluster. Cluster separation (Sep) may be calculated using Equation 4. To compute it, for all clusters i,j∈{1, . . . , K}, $(y_1^j)$ is defined as the KPI values for the test set for cluster i, and $(\hat{y}_1^{i,j})$ is defined as the fitted values of $(y_1^i)$ using the best prediction function obtained for cluster j.

$$Sep(i) := Sep((y_1^i)) := (K-1)\frac{\Sigma_1 |y_1^i - \hat{y}_1^{i,i}|}{\Sigma_{j \neq i}\Sigma_1 |y_1^i - \hat{y}_1^{i,j}|} \quad \text{Equation 4}$$

In Equation 4, the Sep(i) value for cluster i is equal to 1 (e.g., the sums in the numerator and denominator are equals) if the prediction is not dependent of cluster i. If, however, predictions are well fitted and lead to different predictions, then Sep $((y_1^i))$ is smaller than 1 for all clusters i. If a prediction a cluster i is badly fitted, then Sep $((y_1^j))$ for another clusters j, even if the prediction for cluster j is well fitted.

Continuing with FIG. 6, process 600 may include determining a total error for a set of k clusters 210 based on the minimum cluster errors and the intra-cluster distances (block 660) For example, cell clustering module 320 may determine a total error (Err.) for the k clusters based on a combination of ER values from Equation 3 and Sep values from Equation 4. As shown in Equation 5, the Err. Value may be computed from mean error rates and mean cluster separations from using the k clusters.

$$Err.(K) = \text{mean}_i(ER(i) + \text{mean}_i(Sep(i)) \quad \text{Equation 5}$$

If a small number of clusters k is selected, a large amount of data is available for each cluster but the clusters are not specific and can lead to a high bias in predictions. Therefore, the ER and Sep values may typically decrease when increasing the number of cluster k (while the data training set is sufficiently large). But if an excessively large number of clusters k is selected, each cluster 201 may be more specific to a behavior, but fewer data is typically available, and any predictions may have a high variance. This characteristic may also cause ER values and the Sep. values to increase.

As shown in FIG. 6, process 600 may also include determine whether a total value (Err.) for the k clusters 201 is less than a threshold value (block 670). If total value (Err.) is more than a threshold value (block 670—No), cell clustering module 320 may increase the number of clusters k and may regroup the cells 120 into the increased number of clusters (block 680). Cell clustering module 320 may then repeat blocks 620-670 to determine whether a new total error value (Err) for the increased number of k clusters 201 is less than the threshold value. If total value (Err.) is less than the threshold value (block 670—Yes), cell clustering module 320 may use the k clusters and the selected regression algorithms (block 690).

Referring back to FIG. 5, KPI estimation module 330 may estimate the KPI values for cells 120 based on clusters 201 (block 530). Estimating of the KPI values for cells 120 is described with respect to FIG. 7. FIG. 7 is a flow diagram showing an exemplary process 700 for estimating the KPI values for cells 120 in service network 140, such as an LTE network. In an embodiment, process 700 may be performed by components of resource allocator 110 depicted in FIG. 3. In other embodiments, one or more portions of process 700 may be performed by one or more other components of environment 100 and/or wireless environment 200, such as user device 130 and/or a component of service network 140.

Figure 7:
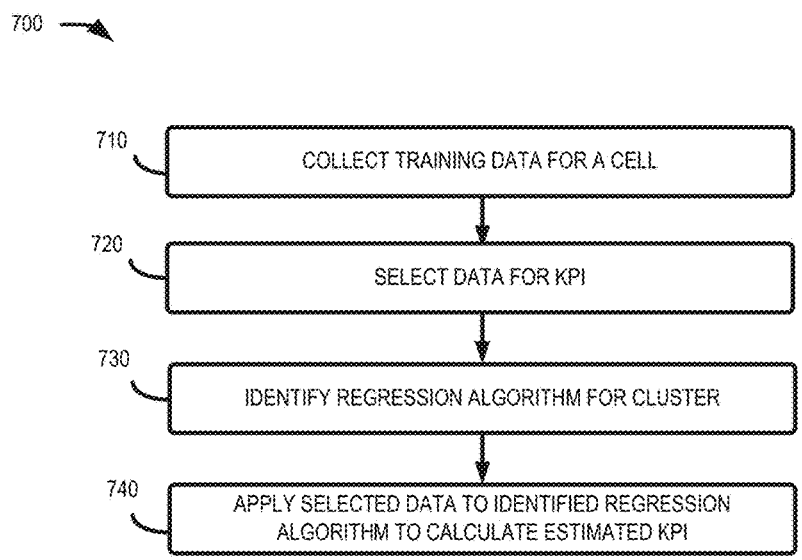
FIG. 7 is a flow chart showing an exemplary process for estimating a key performance indicator (KPI) based on clustering cells.

As shown in FIG. 7, process 700 may include collecting testing data for a cell 120 (block 710) and selecting data that is relevant for a KPI of interest (block 720). For example, KPI estimation module 330 may obtain testing data for cluster 201 associated with a cell 120 (e.g., the reserved 70% of usage data 102 not used in block 520 to aggregate cells 120 into clusters 201) and filter the testing data to obtain a portion of usage data 102 that is relevant to the KPI for the cluster 201. In this way, data from other cells 120 in a cluster 201 may be used to estimate the KPI value for a given cell 120. Because the cells in a cluster 201 are determined to be statistically related, the data from these cells may improve the accuracy of predicting the KPI.

Continuing with FIG. 7, process 700 may further include identifying a regression algorithm for cluster 201 associated with the given cell 120 (block 730), and applying the selected test data to the identified regression algorithm to calculate the KPI (block 740). For example, KPI estimation module 330 may identify the regression algorithm selected in block 630 as generating the smallest error for the cluster 201 associated with the given cell 120, and KPI estimation module 330 may use the identified regression algorithm to determine the KPI. Because different regression algorithms may be selected for different clusters 201, improved KPI estimation accuracy may be achieved for clusters 201.

Returning to FIG. 5, process 500 may include allocating network resources based on the estimated KPIs (block 540). For example, resource allocation module 340 may determine whether an estimated KPI value for a cell 120 is outside a desired range of values, and resource allocation module 340 may modify the resources allocated to the cell when the estimated KPI value is outside the desired range of values. For example, resource allocation module 340 may allocate additional communications resources for a given cell 120 if the KPI indicates that the usage level for the given cell 120 is expected to exceed a desired level during a time period.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed.

Modifications and variations are possible in light of the above teachings or may be acquired from practice of the invention. For example, while series of messages and/or blocks have been described with regard to FIGS. 5-7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   collecting, by a processor, usage data related to a plurality of cells of a service network;
   splitting, by the processor, the usage data into a training data portion and a test data portion, wherein the training data portion is smaller than the test data portion;
   grouping, by the processor, cells of the plurality of cells into clusters;
   selecting, by the processor, regression algorithms for the clusters, wherein the regression algorithms are selected based on the training data portion of the usage data, wherein the regression algorithms are selected from a group of regression algorithms, and wherein selecting the regression algorithms includes:
      identifying prediction errors for the group of regression algorithms for each of the clusters, and
      determining, as the regression algorithms, ones of the group of regression algorithms associated with the smallest prediction errors for each of the clusters;
   identifying, by the processor, a key performance indicator (KPI) related to a communication resource for a cell of the plurality of cells;
   identifying, by the processor, one of the clusters that includes the cell, wherein the one of the clusters is associated with one of the regression algorithms;
   calculating, by the processor, a value for the KPI based on the test data portion of the usage data and the one of the regression algorithms; and
   allocating, by the processor, the communication resource to the cell based on the calculated value for the KPI.

2. The method of claim 1, wherein the group of regression algorithms includes at least two of:
   a generalized additive model (GAM),
   a gradient boost method (GBM),
   a neural network method, and
   multivariate adaptive regression splines (MARS) method.

3. The method of claim 1, wherein the clusters are first clusters, wherein the first clusters include a first quantity of clusters, and wherein grouping the cells into the clusters includes:
   calculating degrees of separation associated with pairs of the first clusters;
   determining a total error for the first clusters based on the degrees of separation and the prediction errors; and
   grouping the cells into second clusters when the total error is greater than a threshold value, wherein the second clusters include a second quantity of clusters that is greater than the first quantity.

4. The method of claim 3, wherein each of the degrees of separation identifies a difference between a first KPI value calculated for one of the clusters and a second KPI value calculated for other ones of the clusters.

5. The method of claim 1, wherein calculating the value for the KPI includes:
   filtering the usage data to identify a portion of the usage data that is relevant to the KPI and the cell, wherein the KPI is calculated from the filtered usage data.

6. The method of claim 1, wherein allocating the communication resource to the cell includes:
   increasing an amount of the communication resource to the cell when the calculated KPI value is greater than a first threshold value; and
   decreasing an amount of the communication resource to the cell when the calculated KPI value is less than a second threshold value that is less than the first threshold value.

7. The method of claim 1, wherein the usage data includes a quantity of messages associated with the plurality of cells during a particular time period or an amount of data exchanged within the messages during the particular time period.

8. A device comprising:
   a memory configured to store instructions; and
   a processor configured to execute one or more of the instructions to:
      collect usage data related to cells of a service network;
      divide the usage data into a training data portion and a test data portion, wherein the training data portion is smaller than the test data portion;
      group the cells into clusters;
      select regression algorithms for the clusters, wherein the regression algorithms are selected based on the training data portion of the usage data, wherein the regression algorithms are selected from a group of regression algorithms, and wherein the processor, when selecting the regression algorithms, is further configured to:
         identify prediction errors for the group of regression algorithms for each of the clusters, and select, as the regression algorithms, regression algorithms of the group of regression algorithms associated with the smallest prediction errors for each of the clusters;
identify a key performance indicator (KPI) related to a communication resource for a cell of the cells;
identify a cluster of the clusters that includes the cell, wherein the cluster is associated with one of the regression algorithms;
calculate a value for the KPI based on the test data portion of the usage data and the one of the regression algorithms; and
allocate the communication resource to the cell based on the calculated value for the KPI.

9. The device of claim 8, wherein the group of regression algorithms includes at least two of:
a generalized additive model (GAM),
a gradient boost device (GBM),
a neural network device, and
a multivariate adaptive regression splines (MARS) device.

10. The device of claim 8, wherein the clusters are first clusters, wherein the first clusters include a first quantity of clusters, and wherein the processor, when grouping the cells into the clusters, is configured to:
calculate degrees of separation associated with pairs of the first clusters;
determine a total error for the first clusters based on the degrees of separation and the prediction errors; and
group the cells into second clusters when the total error is greater than a threshold value, wherein the second clusters include a second quantity of clusters that is greater than the first quantity.

11. The device of claim 10, wherein each of the degrees of separation identifies a difference between a first KPI value calculated for one of the clusters and a second KPI value calculated for other ones of the clusters.

12. The device of claim 8, wherein the processor, when calculating the value for the KPI, is further configured to:
filter the usage data to identify a portion of the usage data that is relevant to the KPI and the cell, wherein the KPI is calculated from the filtered usage data.

13. The device of claim 8, wherein the processor, when allocating the communication resource to the cell, is configured to:
increase an amount of the communication resource to the cell when the calculated KPI value is greater than a first threshold value; and
decrease an amount of the communication resource to the cell when the calculated KPI value is less than a second threshold value that is less than the first threshold value.

14. The device of claim 8, wherein the usage data includes a quantity of messages associated with the cells during a particular time period or an amount of data exchanged within the messages during the particular time period.

15. A non-transitory computer readable memory to store one or more of instructions that cause a processor to:
collect usage data related to cells of a service network;
divide the usage data into a training data portion and a test data portion, wherein the training data portion is smaller than the test data portion;
group the cells into clusters;
select regression algorithms for the clusters, wherein the regression algorithms are selected based on the training data portion of the usage data, wherein the regression algorithms are selected from a group of regression algorithms, and wherein the processor, when selecting the regression algorithms, is further configured to:
identify prediction errors for the group of regression algorithms for each of the clusters, and
select, as the regression algorithms, regression algorithms of the group of regression algorithms associated with the smallest prediction errors for each of the clusters;
identify a key performance indicator (KPI) related to a communication resource for a cell of the cells;
identify a cluster of the clusters that includes the cell, wherein the cluster is associated with one of the regression algorithms;
calculate a value for the KPI based on the test data portion of the usage data and the one of the regression algorithms; and
allocate the communication resource to the cell based on the calculated value for the KPI.

16. The non-transitory computer readable memory of claim 15, wherein the group of regression algorithms includes at least two of:
a generalized additive model (GAM),
a gradient boost device (GBM),
a neural network device, and
a multivariate adaptive regression splines (MARS) device.

17. The non-transitory computer readable memory of claim 15, wherein the clusters are first clusters, wherein the first clusters include a first quantity of clusters, and wherein one or more instructions further cause the processor, when grouping the cells into the clusters, to:
calculate degrees of separation between pairs of the first clusters;
determine a total error for the first clusters based on the degrees of separation and the prediction errors; and
group the cells into second clusters when the total error is greater than a threshold value, wherein the second clusters include a second quantity of clusters that is greater than the first quantity.

18. The non-transitory computer readable memory of claim 17, wherein the degree of separation identifies a difference between a first KPI value calculated for one of the clusters and a second KPI value calculated for other ones of the clusters.

19. The non-transitory computer readable memory of claim 15, wherein the one or more instructions cause the processor, when calculating the value for the KPI, to:
filter the usage data to identify a portion of the usage data that is relevant to the KPI and the cell, wherein the KPI is calculated from the filtered usage data.

20. The non-transitory computer-readable medium of claim 15, wherein the usage data includes a quantity of messages associated with the cells during a particular time period or an amount of data exchanged within the messages during the particular time period.

* * * * *